(12) United States Patent  (10) Patent No.: US 8,073,909 B2
Yen  (45) Date of Patent: Dec. 6, 2011

(54) HYBRID PLATFORM FOR VIDEO GAMES

(75) Inventor: Wei Yen, Seattle, WA (US)

(73) Assignee: iGware Inc.,, Mountain View, CA (US)

( * ) Notice: Subject to any disclaimer, the term of this patent is extended or adjusted under 35 U.S.C. 154(b) by 484 days.

(21) Appl. No.: 12/264,260

(22) Filed: Nov. 4, 2008

(65) Prior Publication Data

US 2010/0113156 A1    May 6, 2010

(51) Int. Cl.
*G06F 15/16* (2006.01)
*G06F 17/00* (2006.01)
*G06F 19/00* (2011.01)
*A63F 9/24* (2006.01)
*A63F 13/00* (2006.01)

(52) U.S. Cl. .......................................... 709/205; 463/42
(58) Field of Classification Search .................. 709/205; 463/42
See application file for complete search history.

(56) References Cited

U.S. PATENT DOCUMENTS

2007/0287498 A1* 12/2007 Wang et al. ................ 455/556.1
2008/0254878 A1* 10/2008 Saunders et al. ................ 463/29

* cited by examiner

*Primary Examiner* — George Neurauter
(74) *Attorney, Agent, or Firm* — Joe Zheng; Wuxi Sino-US IP Agency, Ltd.

(57) ABSTRACT

Techniques for providing a hybrid platform for video games are disclosed. To enjoy the video and audio quality a TV could provide, all game actions with a video game are provided via a TV. However, the video game itself is running on a generic personal computer (PC). In one embodiment, a game hub is provided to receive from a game controller various game actions by a game player with the video game. The game hub provides an (wired or wireless) interface for transferring signals representing the game actions to the PC, in return the PC provides an uncompressed digital stream to the TV for display.

30 Claims, 6 Drawing Sheets

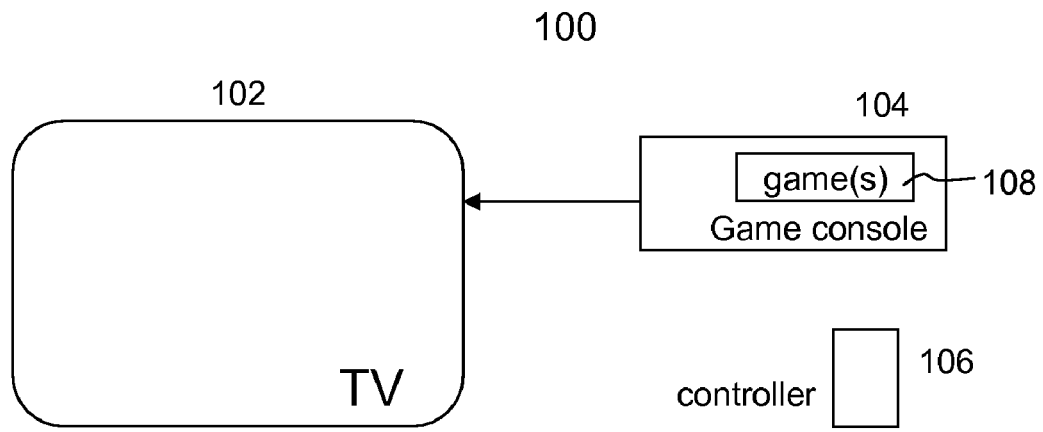
(Prior Art) FIG. 1
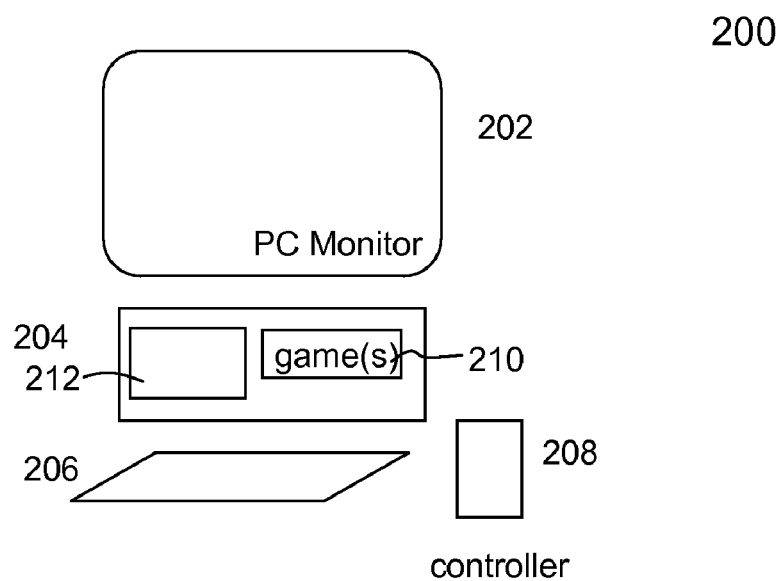
(Prior Art) FIG. 2

HYBRID PLATFORM FOR VIDEO GAMES

BACKGROUND

The present invention is generally related to the area of video games. In particular, the present invention is related to a hybrid platform for video games, wherein it includes a generic personal computer (PC) and a television (TV), thus providing a gaming environment and other useful features in addition to what a video game console could provide.

The present invention discloses a hybrid platform inclding a TV, a game hub and a generic PC. The game hub is provided to receive game actions from at least a game controller being used by a user and the TV is provided to display an uncompressed digital stream from the PC runing a game in accordance with data representing the game actions.

SUMMARY

This section is for the purpose of summarizing some aspects of embodiments of the present invention and to briefly introduce some preferred embodiments. Simplifications or omissions in this section as well as in the title and the abstract of this disclosure may be made to avoid obscuring the purpose of the section, the title and the abstract. Such simplifications or omissions are not intended to limit the scope of the present invention.

Broadly speaking, the invention relate to techniques for providing a hybrid platform for video game with a plurality of useful features in addition to what a video game console could provide. To enjoy the video and audio quality a TV could provide, all game actions with a video game are provided via a TV. However, the video game itself is running on a generic personal computer (PC). According to one aspect of the present invention, a game hub is provided in the vicinity of the TV and supports a plurality of controllers to be used by one or more game players. The game hub transmits signals representing the game actions from the controller to the PC that executes the video game in accordance with the signals. Being a generic computing device, the PC is configured to execute the video game and may be used for other general purposes, such as writing documents, preparing presentations, managing finance or browsing the Internet.

According to another aspect of the present invention, the game hub is designed to allow a game player to operate the PC, for example, turn on or off the PC. In one case, the game hub allows a game player to select a video game among all others from the controller without having to go to the PC to operate the PC directly.

According to still another aspect of the present invention, the functions of the game hub are integrated in a PC. In other words, the controllers being used by the game players communicate directly with the PC while the PC provides uncompressed digital streams to the PC.

In general, a PC is more resourceful than an enclosed game console. According to still another aspect of the present invention, the PC can be equipped with programs or plug-in modules to be associated with a video game to make the video game more controllable in a sense that a game player may set up where a video game may be restarted, store stats and data pertaining to the game in a portable device or a game controller and start up the game from another new computing device without having to start all over again.

According to yet another aspect of the present invention, a software virtual machine may be installed on a PC running under a traditional operating system (e.g., Windows, Mac or Linux). The software virtual machine co-exists but is not part of the traditional operating system on the PC. This virtual machine allows a game player to turn on and run quickly a video game without invoking the traditional operating system. The game player in this situation could enjoy a video game play on the TV without having to wait for the longer boot (or, invoking) time of the traditional operating system.

Embodiments of the invention may be implemented in numerous ways, including a method, system, device, or a computer readable medium. Several embodiments of the invention are discussed below. In one embodiment, the present invention is a game system comprising: at least a game controller being used by a game player; a game hub coupled to the game controller and receiving signals representing various game actions from the game controller; a personal computer (PC) loaded with a video game and caused to execute and manipulate the video game in accordance with data representing the game actions, and producing corresponding uncompressed digital streams; and a television (TV) receiving the digital streams from the PC and displaying the video game to the game player. In another embodiment, the game hub acts as a bridge to facilitate a connection between the TV and the PC, where the TV receives the digital streams from the PC via the game hub.

In yet another embodiment, the present invention is a game system comprising: at least a game controller being manipulated by a game player; a personal computer (PC) loaded with a video game and caused to execute and manipulate the video game in accordance with data representing the game actions, and producing corresponding uncompressed digital streams; and a television (TV) receiving the uncompressed digital streams from the PC and displaying the video game to the game player.

There are many objects, features, and advantages in the present invention. These objects, features, and advantages will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 1 shows a prior art configuration including a TV and a game console communicating with a game controller;

FIG. 2 shows a prior art configuration of a PC video game;

DETAILED DESCRIPTION OF THE INVENTION

Figure 3:
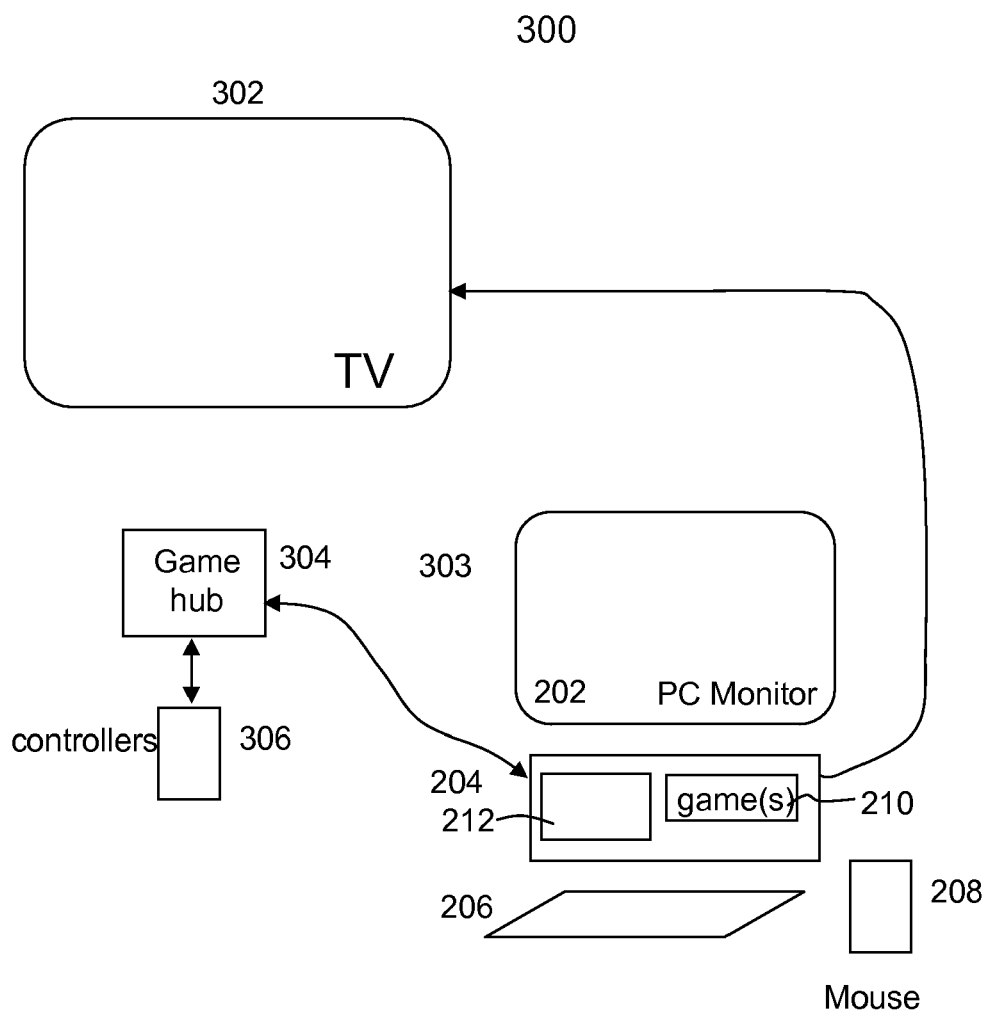
FIG. 3 shows an exemplary configuration according to one embodiment of the present invention.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

FIG. 1 shows a prior art configuration 100 including a TV 102 and a game console 104 being interacted with a controller 106. The game console 104 is typically loaded with a game or games 108 dedicated for the type of the game console 104. A player uses the controller 106 with other possible accessories to control or manipulate the video game 108 being executed in the game console 104 but being displayed on the TV 102. Although the game console 104 may or may not be connected to a server or another game console via the Internet, the game console 104 displays all resulting video sequences (video and audio signals) on the TV 102. One important feature of FIG. 1 is that the game console 104 includes all the necessary logics in an enclosure to execute a video game 108 and output signals directly to the TV 102.

The game console 104, where the logic and graphics of a video game are computed and processed, has an (its own) enclosure with power sourcing from an electrical outlet or batteries. The signals of game controller(s) 106 and associated accessories are connected and funneled into the game console 104 directly with wired or wireless means that in turns manipulates and controls the video game on the TV 102.

FIG. 2 shows a prior art configuration 200 of a PC video game. The configuration 200 is essentially a generic PC including a PC monitor 202, a computing base 204, a keyboard 206 and a controller (or mouse) 208. Different from a game console, a generic PC is not specifically designed for playing a video game rather for running as many applications/programs as possible. In a sense, the PC is not optimized for running a video game but may have a sufficient amount of computing power to run the video game and display the video game right on the PC monitor 202. In general, a game player must sit near the PC and look at the PC monitor 202 while playing the game. Nevertheless, the configuration 200 of FIG. 2 is not a preferable setting for group entertainment.

FIG. 3 shows an exemplary configuration 300 according to one embodiment of the present invention. The configuration 300 includes a TV 302 and a PC 303, and a game hub 304. In general, a TV is placed in a large room (e.g. a family room) for group entertainment while the PC is placed in a small room (e.g., a home office). One of the important benefits, advantages and features in the present invention is to utilize the best of a TV and a generic PC to achieve what a game console could provide and more, allowing a game to be played in front of a TV while using the vast computing resources available on the PC 303.

According to one embodiment, on one end, the game hub 303 is placed in the vicinity of the TV 302 and coupled to a number of game controllers via a wired or wireless means (e.g., IR, RF or bluetooth). On the other end, the game hub 303 communicates with the PC 303 via a wireless means (e.g., RF, or WiFi) to transmit commands or interactions (i.e., game actions) from game controllers being used by game players. In other words, the PC 303 runs the game and executes the game actions from the game players while the TV 302 displays the game with the game actions from the game players.

Figure 4:
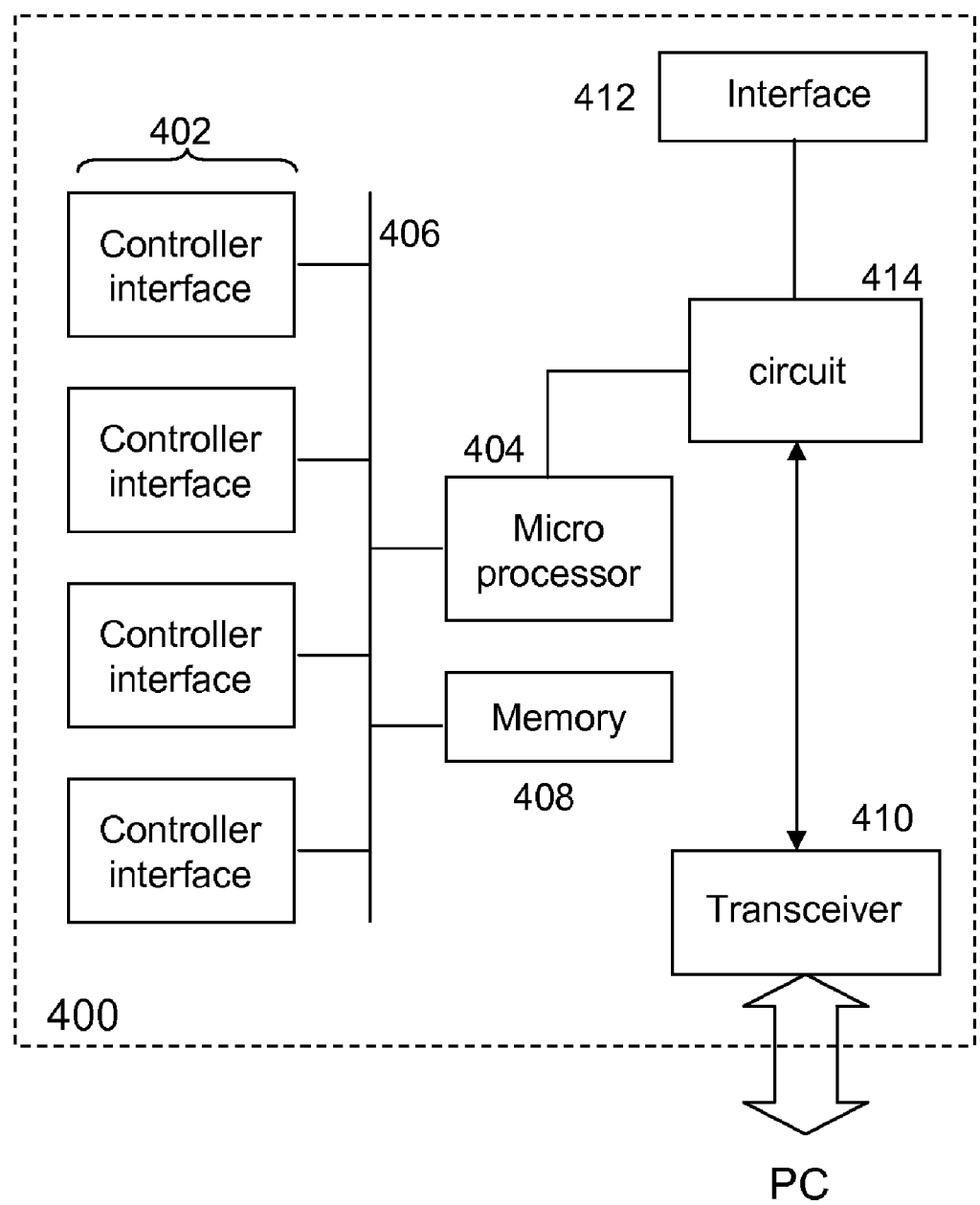
FIG. 4 shows a game hub that may support up to four players at the same time and be used in FIG. 3.

FIG. 4 shows an exemplary function block diagram 400 of a game hub that may be used in FIG. 3. The game hub 400 may support in theory as many players as needed. The game hub 400 as shown in FIG. 4 supports up to four game players at a time, thus including four controller interfaces 402. Each of the controller interfaces 402 works independently in a sense that the game hub 400 functions as long as there is one controller connected to one of the controller interfaces 402. A user may manipulate a controller while looking at a TV to, for example, make a turn, run or punch an in-game object. Depending on implementation, signals or data representing game actions from the controller are coupled to the game hub 304. A microprocessor 404 executes one or more modules stored in memory 408 via a bus 406 to process the data representing the game actions from the player. A circuit 414, collectively representing all other logics in the game hub 400, is provided to convert the data into a proper form before the data is transported to a PC via a transceiver or an interface 410. Those skilled in the art may understand that, depending on how the data is transported to the PC, the circuit 414 and the transceiver 410 may be implemented differently. There are a number of methods available and well known in the art (e.g., RF, Bluetooth or WiFi).

In one embodiment, the interface 412 is provided to be coupled to one or more sensors. Depending on implementation, examples of the sensors include, but may not be limited to, motion sensors, video cameras, temperature sensors, accelerometers, gyroscopes or magnetic field sensors. With one or more appropriate sensors coupled to the interface 412, a video game may be played with more excitement or with other actions from the game players. Accordingly, the game actions as described herein may include sensor data should one or more sensors be provided or supported by the game hub 400.

It should be noted that the PC 303 in FIG. 3 is not exclusively designed for playing a game. Besides games 210, the PC 303 may be installed with other programs 212, for example, including Microsoft Office and an Internet browser. The PC 303 runs video games and can be used for other applications, for example, running Word, PowerPoint in Microsoft Office or browsing the Internet, communicating with other devices (e.g., servers or PCs).

In FIG. 3, the logic and graphics of a video game are computed and processed in the PC 303 that has an enclosure with power sourcing from an electrical outlet or batteries. The majority of the signals of game controller(s) with possible associated accessories are funneled by a wired or wireless means into the game hub 304 that has its own enclosure with power sourcing from an electrical outlet or batteries, and then, the signals of the game hub 304 are by a wired or wireless means funneled into the PC 304. In return, the PC 304 manipulates the video game in accordance with the signals of the game hub 304 and controls the video game on the PC 304 and sends the resulting video game sequences (uncompressed digital streams) back to the TV. The game hub 304 serves as an intermediary and collects majority of the signals from the game controller(s) and accessories.

According to one embodiment, the game hub 304 can be controlled to operate the PC 303 without having to go to the PC 303 for operation. Keys or buttons on a game controller may be configured to function like a mouse or a remote controller. Through the game hub 304 that communicates with the PC, a user or game player may turn on or off the PC 303, cause the PC 303 to display a list of games available from which the user may select one game to run. In another embodiment, a user may run an Internet browser in the PC to browse the Internet or run a program/application. One exemplary application is a photo display. Without gathering a group of people in a small office, a user may simply use a game controller to cause the PC 303 to start a photo presentation to the group of people in a large family room, typically with much more comfortable seating. All comments and entries made on a game controller are transported to the PC 303 as if the game controller was a mouse.

In general, a PC is more resourceful than an enclosed game console. According to one embodiment, the PC is equipped with programs or plug-in modules that are stored in memory or storage 212. A game player may run the programs or modules to be associated with a video game to make the video game more controllable in a sense that a game player may set up where a video game may be restarted, store stats and data pertaining to the game in a game controller, or a portable device, and start up the game from another new computing device without having to start all over again. In one application, a user may email saved data pertaining to a video game to another PC where the video game may be started as if it was continued from the original PC.

One problem that exists with a PC is a relatively longer time to boot, or invoke up an operating system (e.g., Windows, Mac or Linux). Although the problem may be resolved over time, one embodiment of the present invention is to install, what is commonly referred to as a software virtual machine. The software virtual machine co-exists but is not part of the operating system on the PC. This virtual machine allows a game player to turn on and run quickly a video game without invoking the traditional operating system. The game player in this situation could enjoy a video game play on the TV without having to wait for the relatively longer boot (or invoking) time of the traditional operating system.

As described above, the communication between the game hub and the PC can be carried over the air (wireless). To have a secure environment, the PC may be installed a security module, likewise on the game hub, to have the communication secured between the PC and the game hub. Without a PC, many features that otherwise could not be done in a game console can now be implemented because the PC nowadays could be much powerful than a game console in terms of available resources.

Figure 5:
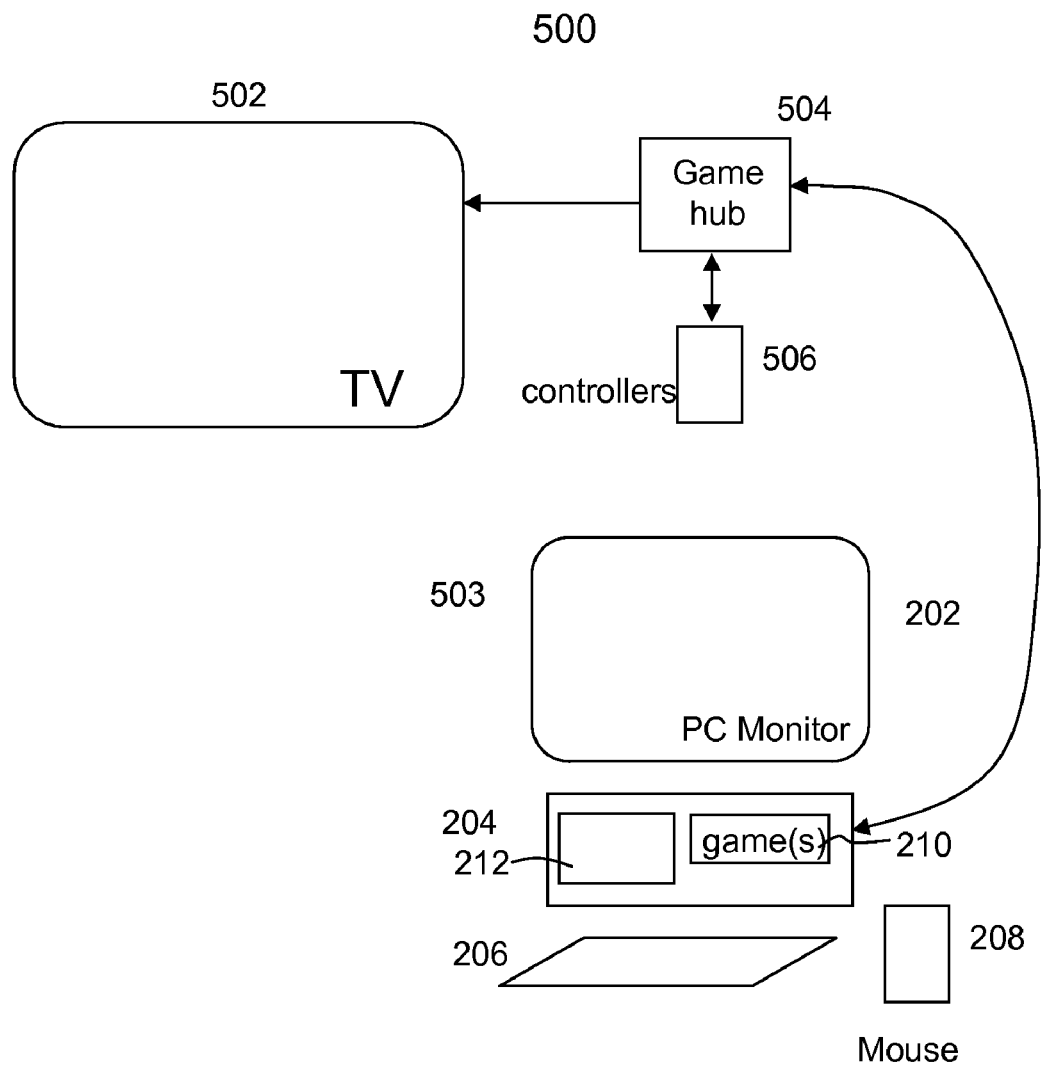
FIG. 5 shows an exemplary configuration according to another embodiment of the present invention.

FIG. 5 shows another exemplary configuration 500 according to one embodiment of the present invention. The configuration 500 includes a TV 502 and a PC 503, where the TV 502 and the PC 503 are coupled via a game hub 504. On one end, the game hub 503 is placed in the vicinity of the TV 502 and supplies video and audio signals to the TV 502 by a set of cables or a wireless means (e.g., RF, wireless HDMI or HD). On the other end, the game hub 504 communicates with the PC 503 via a wireless means (e.g., RF, Bluetooth or WiFi) to transmit commands or interactions (collectively game) from game controllers being used by game players and receive uncompressed digital streams from the PC 503. In other words, the PC 503 runs the game and executes commands from the game players and produce corresponding uncompressed digital streams to the game hub 503 that in return causes the TV 302 to display the game with the game actions from the game players. Thus the game hub 504 acts also as a bridge to facilitate a connection between the TV 503 and the PC 503.

Figure 6:
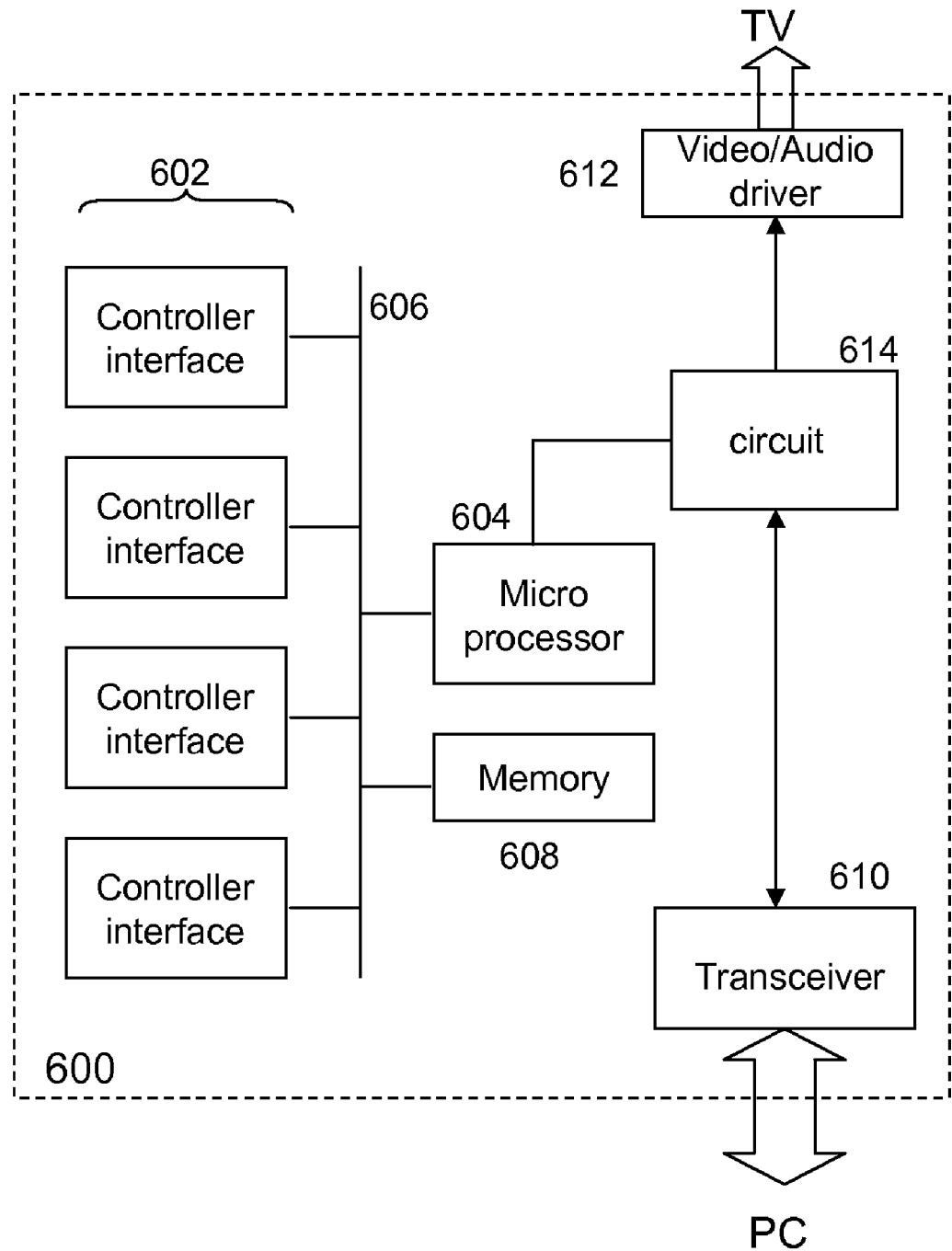
FIG. 6 shows a game hub that may support up to four players at the same time and be used in FIG. 5.

FIG. 6 shows an exemplary function block diagram 600 of a game hub that may be used in FIG. 5. The game hub 600 may support in theory as many players as needed. The game hub 600 as shown in FIG. 6 supports up to four game players at a time, thus including four controller interfaces 602. Each of the controller interfaces 602 works independently in a sense that the game hub 600 functions as long as there is one controller connected to one of the controller interfaces 602. A user may manipulate a controller while looking at a TV to, for example, turn, run or punch a in-game object. Depending on implementation, signals or data representing the signals of the game actions from the controller are transported to the game hub 604. A microprocessor 604 executes one or more modules stored in memory 608 via a bus 606 to process the data representing the game actions from the player. A circuit 614, collectively representing all other logics in the game hub 600, is provided to convert the data into a proper form before the data is transported to a PC via a transceiver 610. Those skilled in the art may understand that, depending on how the data is transported to the PC, the circuit 614 and the transceiver 610 may be implemented differently. There are a number of methods available and well known in the art. Likewise, the circuit 614 receives uncompressed digital streams from the PC and processes and drives the TV though video and audio drivers 612 (e.g., amplifiers).

Figure 7:
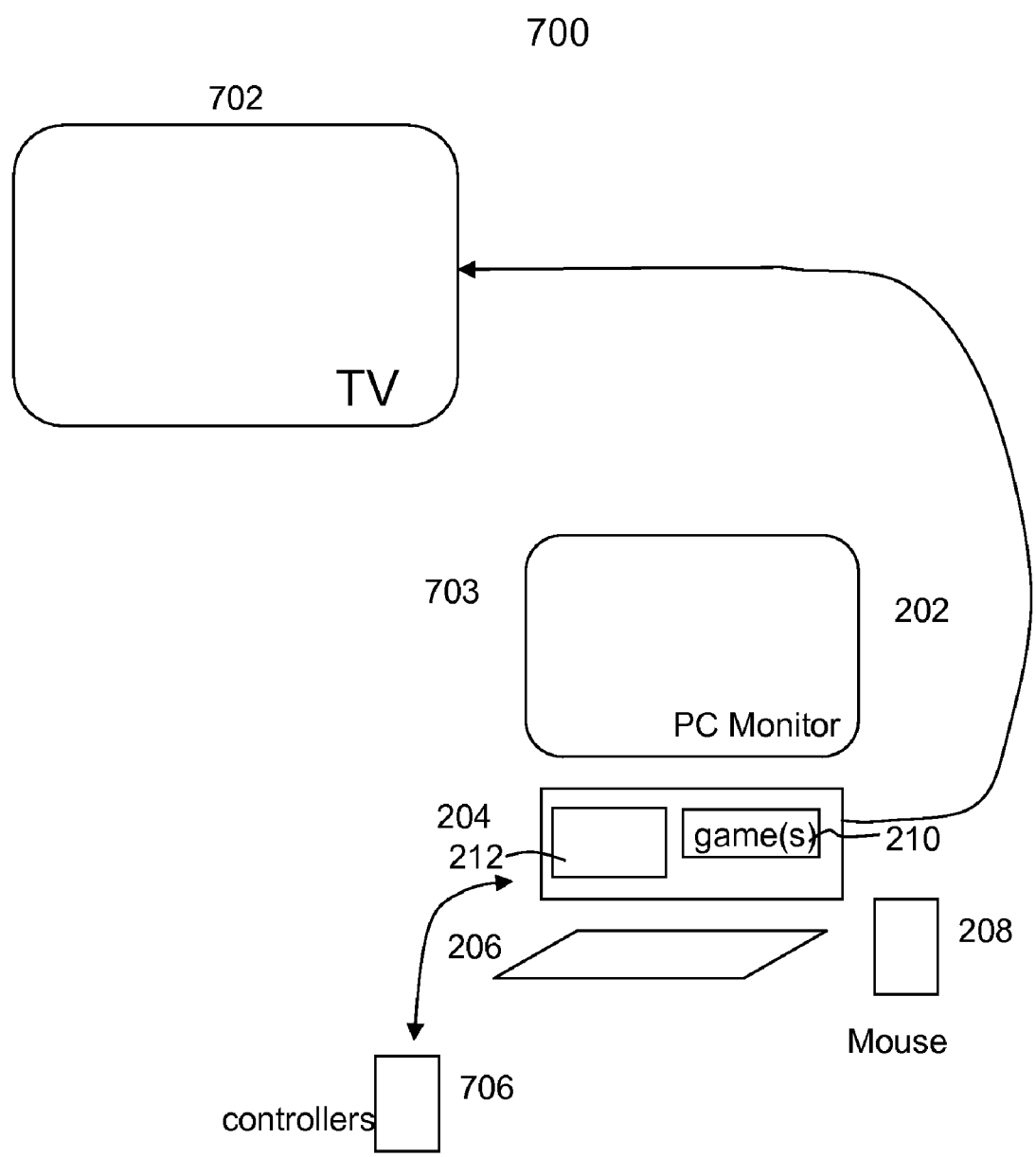
FIG. 7 shows another configuration according to one embodiment of the present invention, in which functions of game controller(s) communicate with a PC directly while the PC provides video and audio signals to a TV.

FIG. 7 shows another configuration 700 according to one embodiment of the present invention, in which functions of a game hub are integrated with a PC 703. As described above, the PC 703 runs a video game and provides video and audio signals directly to a TV 702 uncompressed digital streams (e.g. wireless HDMI or HD). In any case, the game actions from one or more controllers 706 are coupled directly to the PC 703 via a wireless means (e.g., RF, IR, or Bluetooth) in this embodiment. As described above, a TV is usually placed in a large room (e.g. a family room) for group entertainment while the PC is placed in a small room (e.g., a home office). Since a game player plays the video game in front of the TV and is relatively far from the PC, the controller being used by the player is thus also relatively far from the PC 703.

According to the embodiment, the PC 703 is equipped with an add-on adaptor, also referred to as an accessory (not shown), that is provided to receive interaction signals from the controller, likely via a wireless means. The accessory may be connected to the PC 703 by a USB connection. In accordance with the interaction signals, the PC 703 manipulates the game being executed therein and provides uncompressed digital streams to the TV 702 via a cable or a wireless means.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

I claim:
1. A game system comprising:
a television (TV) displaying a video game;
at least a game controller being used by a game player interacting with the video game being displayed on the TV;
a game hub, coupled to the game controller, receiving signals representing various game actions from the game controller; and
a personal computer (PC) loaded with modules for the video game and caused to execute and manipulate the modules in accordance with the signals from the game hub, and producing corresponding digital signals, wherein the game hub is configured to convert the digital signals to digital streams acceptable to drive the TV, the TV and the PC are placed separately or relatively remotely, the game hub is placed substantially near the TV to facilitate data communication between the game controller and the PC, as well as video communication between the TV and the PC.

2. The game system as recited in claim 1, wherein the digital signals from the PC are uncompressed video streams and audio streams.

3. The game system as recited in claim 2, wherein the digital streams from the game hub including video and audio are in compliance with a TV standard.

4. The game system as recited in claim 2, wherein the TV receives the digital streams via a wired means.

5. The game system as recited in claim 2, wherein the TV receives the digital streams via a wireless means.

6. The game system as recited in claim 5, wherein the wireless means includes one of RF, wireless HDMI and wireless HD.

7. The game system as recited in claim 1, wherein the game hub is configured to convey the signals to the PC via a wireless means.

8. The game system as recited in claim 7, wherein the wireless means includes one of RF, bluetooth and WiFi.

9. The game system as recited in claim 1, wherein the video game being executed in the PC is for displaying only on the TV via the game hub.

10. The game system as recited in claim 1, wherein the game hub includes at least a controller interface to communicate with the game controller, a microprocessor, a memory space for storing one or more modules, a circuit and an interface to communicate with the PC, wherein the microprocessor is configured to execute the one or more modules to process the signals and cause the data to be conveyed to the PC via the circuit and the interface.

11. The game system as recited in claim 10, wherein the game controller is configured to remotely turn on/off the PC, to load all available games, or to execute a selected game, and to execute another application.

12. The game system as recited in claim 11, wherein the another application includes one or more of an Office tool, an Internet browser, a financial application and a photo presentation.

13. The game system as recited in claim 1, wherein the PC is installed with programs or modules to be associated with the video game to make the video game more controllable in a sense that the game player decides where the video game restarts, transport stats and data pertaining to the video game to another computing device and start up the video game from the another computing device without having to start the video game all over again.

14. The game system as recited in claim 1, wherein the game controller is installed with programs or modules to be associated with the video game to make the video game more controllable in a sense that the game player decides where the video game restarts, transport stats and data pertaining to the video game to another computing device and start up the video game from the another computing device without having to start the video game all over again.

15. A game system comprising:
    at least a game controller to be manipulated by a game player interacting with a video game being displayed on a television (TV), wherein the video game is being executed in a personal computer (PC) loaded with modules for the video game and caused to execute and manipulate the video game in accordance with data received from the game controller, wherein the data representing various game actions by the game player is transported to the PC, and the PC produces a corresponding uncompressed digital stream with reference to the data, the uncompressed digital stream is in compliance with a standard and acceptable to drive the TV, and the TV and the PC are placed separately or relatively remotely, the game hub is placed substantially near the TV to facilitate data communication between the game controller and the PC.

16. The game system as recited in claim 15, wherein the PC communicates with the game controller to receive the data representing various game actions from the game controller and send the uncompressed digital stream to the TV wirelessly.

17. The game system as recited in claim 16, wherein the game controller is used to remotely turn on/off the PC, to load all available games, or to execute a selected game, and to execute another application.

18. A game system comprising:
    a game hub, coupled to at least a game controller, receiving from the game controller signals representing various game actions by a game player interacting with a video game being displayed on a television (TV), wherein a personal computer (PC) is loaded with modules for the video game and caused to execute and manipulate the video game in accordance with data representing the various game actions, and produce digital streams via the game hub to drive the TV, wherein the game hub is disposed substantially close the TV and receives the digital streams remotely from the PC.

19. The game system as recited in claim 18, wherein the digital streams from the PC are audio and streams.

20. The game system as recited in claim 19, wherein the game hub is configured to perform a signal conversation to the digital streams in compliance with a TV standard to drive the TV.

21. The game system as recited in claim 18, wherein the game hub is configured to receive the digital streams from the PC via a wired means.

22. The game system as recited in claim 18, wherein the game hub is configured to receive the digital streams from the PC via a wireless means.

23. The game system as recited in claim 22, wherein the wireless means includes one of RF, wireless HDMI or wireless HD.

24. The game system as recited in claim 18, wherein the game hub is configured to convey the signals to the PC via a wireless means.

25. The game system as recited in claim 24, wherein the wireless means includes one of RF, IR, bluetooth and WiFi.

26. The game system as recited in claim 18, wherein the TV and the PC are placed separately or relatively remotely, the game hub is configured to bridge the TV and the PC and communicate with at least one game controller.

27. The game system as recited in claim 26, wherein the game hub includes at least a controller interface to receive the game controller, a microprocessor, a memory space for storing one or more modules, a circuit and a first interface to the TV and a second interface to the PC, the microprocessor is configured to execute the one or more modules to process the signals and cause the data to be conveyed to the PC via the circuit and the second interface or the video and audio signal to the TV via the circuit and the first interface.

28. The game system as recited in claim 27, wherein the game controller is used to remotely turn on/off the PC, to load all available games, or to execute a selected game, and to execute another application.

29. The game system as recited in claim 18, wherein the PC is installed with a virtual machine that co-exists but is not part of a traditional operating system on the PC, the virtual machine allows a game player to invoke and run quickly a video game without invoking the traditional operating system.

30. The game system as recited in claim 18, wherein one of the PC or game controller is installed with programs or modules to be associated with the video game to make the video game more controllable in a sense that the game player decides where the video game restarts, transport stats and data pertaining to the video game and start up the video game from another computing device without having to start the video game all over again.

* * * * *